US006178177B1

(12) United States Patent
Vautey

(10) Patent No.: US 6,178,177 B1
(45) Date of Patent: Jan. 23, 2001

(54) DATA-PROCESSING NETWORK HAVING NON-DETERMINISTIC ACCESS, BUT HAVING DETERMINISTIC ACCESS TIME

(75) Inventor: Bernard Vautey, Sceaux (FR)

(73) Assignee: Alcatel, Paris (FR)

( * ) Notice: Under 35 U.S.C. 154(b), the term of this patent shall be extended for 0 days.

(21) Appl. No.: 08/811,246

(22) Filed: Mar. 3, 1997

(30) Foreign Application Priority Data

Feb. 27, 1997 (FR) .................................................. 97 02348

(51) Int. Cl.[7] .......................... H04L 12/413; G06F 15/16
(52) U.S. Cl. ........................... 370/445; 370/446; 370/447; 370/448; 709/225; 709/233; 709/234; 709/235
(58) Field of Search .................................. 709/225, 233, 709/234, 235, 218, 249; 370/431, 445, 446, 447, 448, 458, 459, 460, 461; 375/347

(56) References Cited

U.S. PATENT DOCUMENTS

| 4,271,507 | * | 6/1981 | Gable et al. ........................ 370/432 |
| 4,847,835 | * | 7/1989 | Le Lann et al. .................... 370/447 |
| 5,047,916 | * | 9/1991 | Kondo .................................... 700/61 |
| 5,056,107 | * | 10/1991 | Johnson et al. ..................... 370/203 |
| 5,369,639 | * | 11/1994 | Kamerman et al. ................. 370/347 |
| 5,371,494 | * | 12/1994 | Singh et al. ....................... 340/825.5 |
| 5,381,413 | * | 1/1995 | Tobagi et al. ........................ 370/348 |
| 5,553,072 | * | 9/1996 | Daggett et al. ...................... 370/447 |
| 5,577,069 | * | 11/1996 | Lau et al. ............................. 375/242 |
| 5,592,483 | * | 1/1997 | Hieda et al. ......................... 370/445 |
| 5,600,651 | | 2/1997 | Molle ................................... 370/448 |
| 5,604,869 | * | 2/1997 | Mincher et al. ..................... 709/232 |
| 5,625,825 | * | 4/1997 | Rostoker et al. .................... 710/242 |
| 5,642,360 | * | 6/1997 | Trainin ................................. 370/230 |
| 5,661,727 | * | 8/1997 | Kermani et al. ..................... 370/445 |
| 5,706,274 | * | 1/1998 | Angelico et al. .................... 370/445 |
| 5,734,639 | * | 3/1998 | Bustamante et al. ................ 370/208 |
| 5,737,330 | * | 4/1998 | Fulthorp et al. ..................... 370/346 |
| 5,774,658 | * | 6/1998 | Kalkunte et al. .................... 709/230 |
| 5,784,559 | * | 7/1998 | Frazier et al. ....................... 370/522 |
| 5,802,041 | * | 9/1998 | Waclawsky et al. ................. 370/245 |
| 5,838,688 | * | 11/1998 | Kadambi et al. .................... 370/445 |
| 5,850,525 | * | 12/1998 | Kalkunte et al. .................... 709/235 |
| 5,852,723 | * | 12/1998 | Kalkunte et al. .................... 709/235 |
| 5,854,790 | * | 12/1998 | Scott et al. ........................... 370/401 |
| 5,896,561 | * | 4/1999 | Schrader et al. ..................... 455/67.1 |
| 5,940,399 | * | 8/1999 | Weizman ............................. 370/445 |
| 5,957,854 | * | 9/1999 | Besson et al. ....................... 600/509 |
| 5,963,560 | * | 10/1999 | Kalkunte ............................. 370/448 |
| 5,968,154 | * | 10/1999 | Cho ...................................... 710/119 |
| 6,044,396 | * | 3/2000 | Adams ................................. 709/217 |
| 6,072,798 | * | 6/2000 | Beasley ............................... 370/395 |

FOREIGN PATENT DOCUMENTS

| 0 377 361 A1 | 7/1990 | (EP) . |
| 0 632 619 A3 | 1/1995 | (EP) . |
| 0632 619 | * 1/1995 | (EP) . |

OTHER PUBLICATIONS

V. Y. Zagurski et al, "Random–Access Method with Deterministic Delay and Control Capability", *Automatic Control and Computer Sciences*, vol. 23, No. 3, Jan. 1, 1989, pp. 59–62.

\* cited by examiner

*Primary Examiner*—Mehmet B. Geckil
*Assistant Examiner*—William C. Vaughn, Jr.
(74) *Attorney, Agent, or Firm*—Sughrue, Mion, Zinn, Macpeak & Seas, PLLC

(57) ABSTRACT

A network includes stations that communicate with one another via a common medium using a non-deterministic protocol. The risk of collision between the two frames transmitted simultaneously by two stations is reduced by providing each station with a detector to determine whether there is a risk of collision based on counter updates for recent transmissions performed by the station. Each station further includes a delay to limit a station's means bit rate to a predetermined maximum value when there is a risk of collision of data sent by the stations on the network. The maximum bit rate is chosen such that the sum of the values for all of the stations is less than the mean bit rate that can be accommodated by the common medium.

8 Claims, 3 Drawing Sheets

DATA-PROCESSING NETWORK HAVING NON-DETERMINISTIC ACCESS, BUT HAVING DETERMINISTIC ACCESS TIME

The invention relates to a data-processing network having non-deterministic access, i.e. a network including a plurality of stations communicating with one another by accessing a common medium, using a non-deterministic protocol, i.e. a protocol that does not make it possible to predict the waiting time that will be necessary when a given station requests access to the medium at a given instant. This waiting time is referred to as the "access time" below. For example, a protocol that consists in checking that there is no carrier present on the medium, and in then starting to transmit a message while detecting any collision with another message that happens to start transmitting at the same instant, is a non-deterministic protocol. A station is incapable of predicting transmission of messages by other stations. Access time can be long if traffic on the common medium is heavy. Access time then slows down real-time applications prohibitively.

The most commonly-used common medium is a bus interconnecting all of the stations, or else a "passive hub", i.e. a star interconnector to which each station is connected via an individual link, so that the links are equivalent to a bus going from station to station. To reduce the risk of collision, a first known solution consists in replacing the passive hub with an active hub, i.e. with routing apparatus, to which each station is connected via an individual link, and which enables the number of collisions to be reduced. It is necessary to use a cascade of hubs if the network includes a large number of stations (e.g. sixteen). That solution is therefore very costly, especially if the network is duplicated to make it more reliable.

Conventionally, each station is connected to the common medium via an interface circuit which manages the access protocol for accessing the medium. To reduce the risk of collision, a second known solution consists in modifying the implementation of the access protocol, in the interface circuit, so as to reduce the number of collisions. That solution thus consists in developing a proprietary circuit instead of using a circuit that complies with a standard and is commercially available. That solution is therefore costly.

SUMMARY OF THE INVENTION

An object of the invention is to provide a network in which access time is made deterministic by eliminating almost all risk of collision, by using means that are cheaper than those of the known solutions.

The invention provides a data-processing network having non-deterministic access but having deterministic access time, the network including a plurality of stations communicating with one another by accessing a common medium using a non-deterministic protocol, said network being characterized in that each station includes:

means for detecting whether there is a risk of collision between a plurality of stations trying to access the common medium; and means for limiting its mean bit rate over the common medium to a predetermined maximum value at least during the periods in which there is a risk of collision between a plurality of stations trying to access the common medium, said maximum value being chosen such that the sum of the respective maximum values chosen for all of the stations is less than the mean bit rate that can be accommodated by the common medium.

A network characterized in this way encounters almost no collisions because the sum of the respective maximum values chosen for all of the stations is less than the mean bit rate that can be accommodated by the common medium.

In a preferred embodiment, the means for limiting the mean bit rate of a station comprise time-delay means authorizing a station to accesss the common medium after expiration of a delay starting at the end of the most recent access by the station, and having a duration which is proportional to the duration of said most recent access.

A network characterized in this way is less costly to implement because the time-delay means may be constituted by a portion of the software of the processor of the station. A commercially available interface circuit may be used with no modification.

In a preferred embodiment, the means for detecting whether there is a risk of collision between a plurality of stations trying to access the common medium comprise means for determining whether at least one collision has taken place since the beginning of the most recent transmission performed by the station over the common medium, and for concluding that there is a risk of collision if at least one collision has occurred since the end of the most recent transmission performed by said station.

A network characterized in this way is cheap to implement because the means for detecting whether there is a risk of collision may be implemented by using a collision counter that already exists in certain commercially available interface circuits.

The invention can be better understood and other characteristics appear from the following description and from the accompanying figures, in which.

DESCRIPTION OF PREFERRED EMBODIMENT

The embodiment described below by way of example is a network complying with IEEE standard 802.3, sold under the Ethernet trademark, and having a medium whose mean bit rate is 100 Mbits per second.

Figure 1:
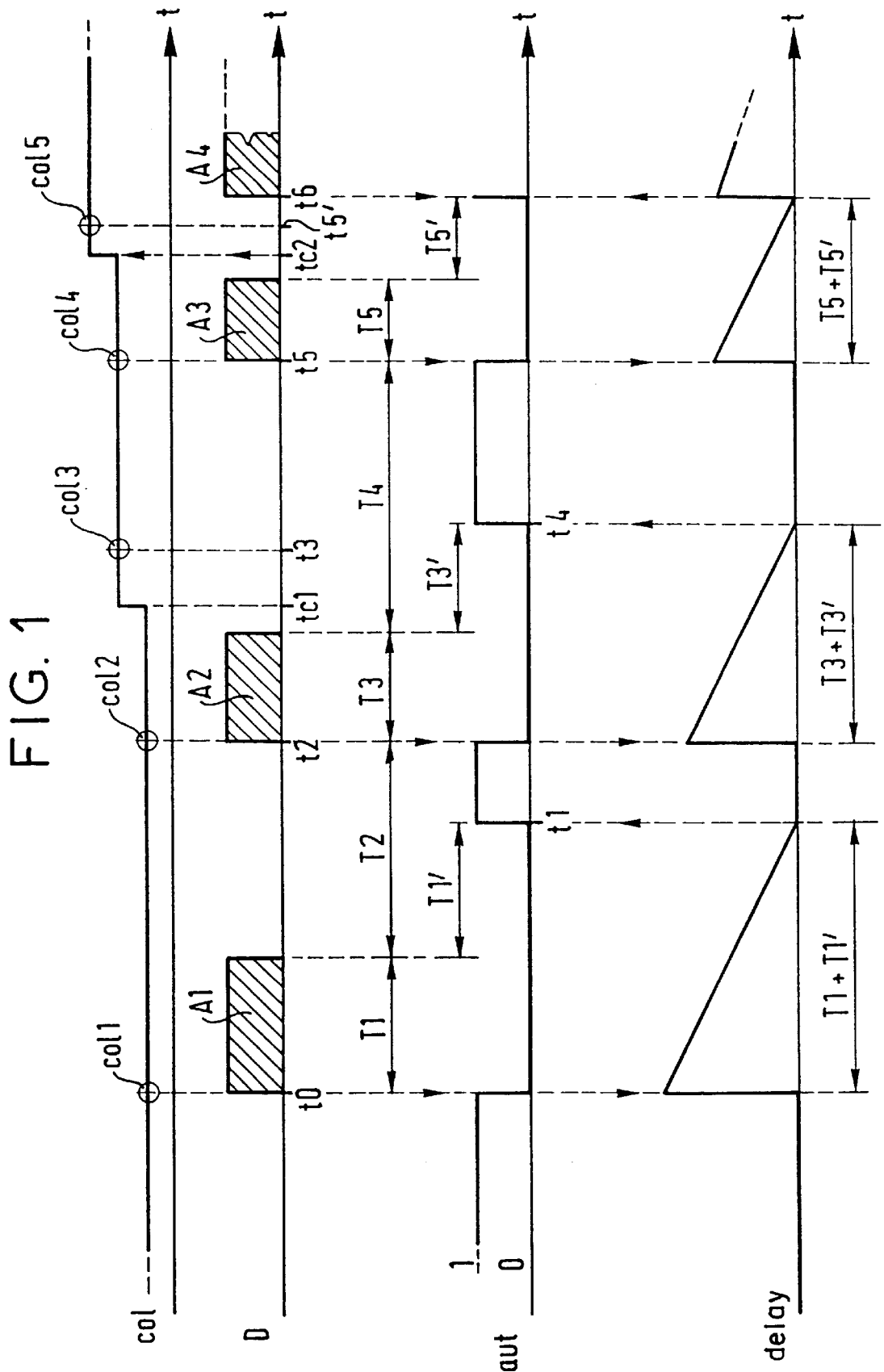
FIG. 1 is a timing diagram showing how an embodiment of a network of the invention operates.

The diagram in FIG. 1 shows a certain number of events which are seen from a given station as a function of time t:

on a first line, the content of a counter "col" indicates the number of collisions on the medium, and the count starts again from zero when it reaches its maximum value which is, for example, 65,535 (16-bit counter);

on a second line, the data frames D which are transmitted by the station in question;

on a third line, the value of a flag "aut" which authorizes the station in question to transmit a frame when it has the value 1; and on a fourth line, the value "delay" is a time-delay counter DELAY.

At the beginning of the time interval shown in FIG. 1, the collision counter "col" has an arbitrary value. No frame is being transmitted. The flag "aut" has the value 1 which authorizes the station to transmit, and the time-delay counter DELAY has the value 0.

At an instant t0, the station needs to transmit a frame A1 over the medium. The value 1 of the flag "aut" indicates to it that it is authorized to access the medium because there is no risk or little risk of collision. It is authorized to transmit the frame A1 immediately. The frame has a length corresponding to a transmission time T1, for example. Just before transmission, the current value "col1" of the collision counter is backed up to serve as a reference in subsequently processing.

At the start of transmission of the frame A1, the time-delay counter DELAY is initialized with a value such that counting down to 0 takes a time T1+T1'. The time T1 is calculated on the basis of the length of the frame A1, and of the nominal bit rate on the common medium. The time T1 is calculated such that the value of the mean bit rate of the station during the interval T1+T1' is equal to the maximum mean bit-rate value chosen for the station in question. In this example, the maximum mean bit-rate value of the station is chosen to be equal to one half of the nominal bit-rate of the common medium. Accordingly, the initialization value is chosen such that it counts down for a time T1+T1' equal to twice the duration T1 of the frame A1 that the station is going to transmit. The flag "aut" is set to zero for the entire count-down time so as to prevent the station in question from occupying the common medium if there is a risk of collision. If there is no risk of collision, the station does not take into account the flag "aut".

When it has finished transmitting the frame Al, the station ceases to transmit for a certain time T2, longer than the time T1'. During this period, the value "delay" of the counter DELAY returns to 0, at instant t1, thereby setting the value of the flag "aut" to 1 again.

Then, at instant t2, the station in question once again needs to send a frame A2 . The value 1 of the flag "aut" authorizes transmission without checking whether there is a risk of collision. The station thus transmits the frame A2 immediately. Just before transmission, the current value col2=col1 of the collision counter is backed up to serve as a reference subsequently. The counter DELAY is initialized at a value T3+T3' such that it counts down for a time equal to twice the duration T3 of the frame A2 that the station is going to transmit. The flag "aut" is set to zero for the entire count-down time T3+T3' so as to prevent the station in question from accessing the common medium if there is a risk of collision.

Then, the station ceases to transmit for a time T4 longer than T3'. After the end of transmission of frame A2, but during the count-down time T3+T3', a collision is detected at instant tc1. The value "col" of the collision counter is then increased by unity. A little later, at an instant t3, the station needs to transmit a frame A3. Since the flag "aut" has the value 0, it prevents the station in question from accessing the medium unless there is no risk of collision. It must thus first determine whether there is a risk of collision. For this purpose, it compares the current value col3 of the counter "col" with the backed-up value col2. The current value col3 is equal to col2+1. Therefore, there is a risk of collision, and the station must defer its transmission until the flag "aut" takes the value 1 again.

At instant t5, the counter DELAY returns to the value 0, the flag "aut" is set to the value one again, and the station then transmits the frame A3 which has a duration T5. Just before transmission, the current value col4 of the collision counter is backed up to serve as a reference subsequently. The time-delay counter DELAY is initialized at a value such that counting down to zero takes a time T5+T5'. In this example, since the maximum mean bit-rate value of the station is chosen to be one half of the nominal bit-rate of the common medium, the initialization value is chosen such that the counter counts down for a time T5+T5' equal to twice the duration T5 of the frame A3 that the station is going to transmit. The flag "aut" is set to zero for the entire count-down time so as to prevent the station in question from accessing the common medium if there is a risk of collision.

After the end of transmission of the frame A3 but during the count-down time T5+T5', a collision is detected at instant tc2. The value of the collision counter "col" is then increased by unity. A little later, at instant t5', the station needs to transmit a frame A4. Since the flag "aut" has the value 0, it prevents the station from accessing the medium, except if there is no risk of collision. It must thus first determine whether there is a risk of collision. For this purpose, it compares the current value col5 of the counter "col" with the backed-up value col4. The current value col5 is equal to col4+1. Therefore there is a risk of collision, and the station must defer its transmission until the flag "aut" takes the value 1 again. At instant t6, the flag "aut" goes to 1, transmission of frame A4 commences, the flag "aut" is reset, and the counter DELAY is re-initialized.

The maximum mean bit rate of each station may be different depending on the station. The only condition that is necessary to reduce the risk of collision is that the sum of the respective maximum values chosen for all of the stations is less than the mean bit rate that can be accommodated by the common medium.

Figure 2:
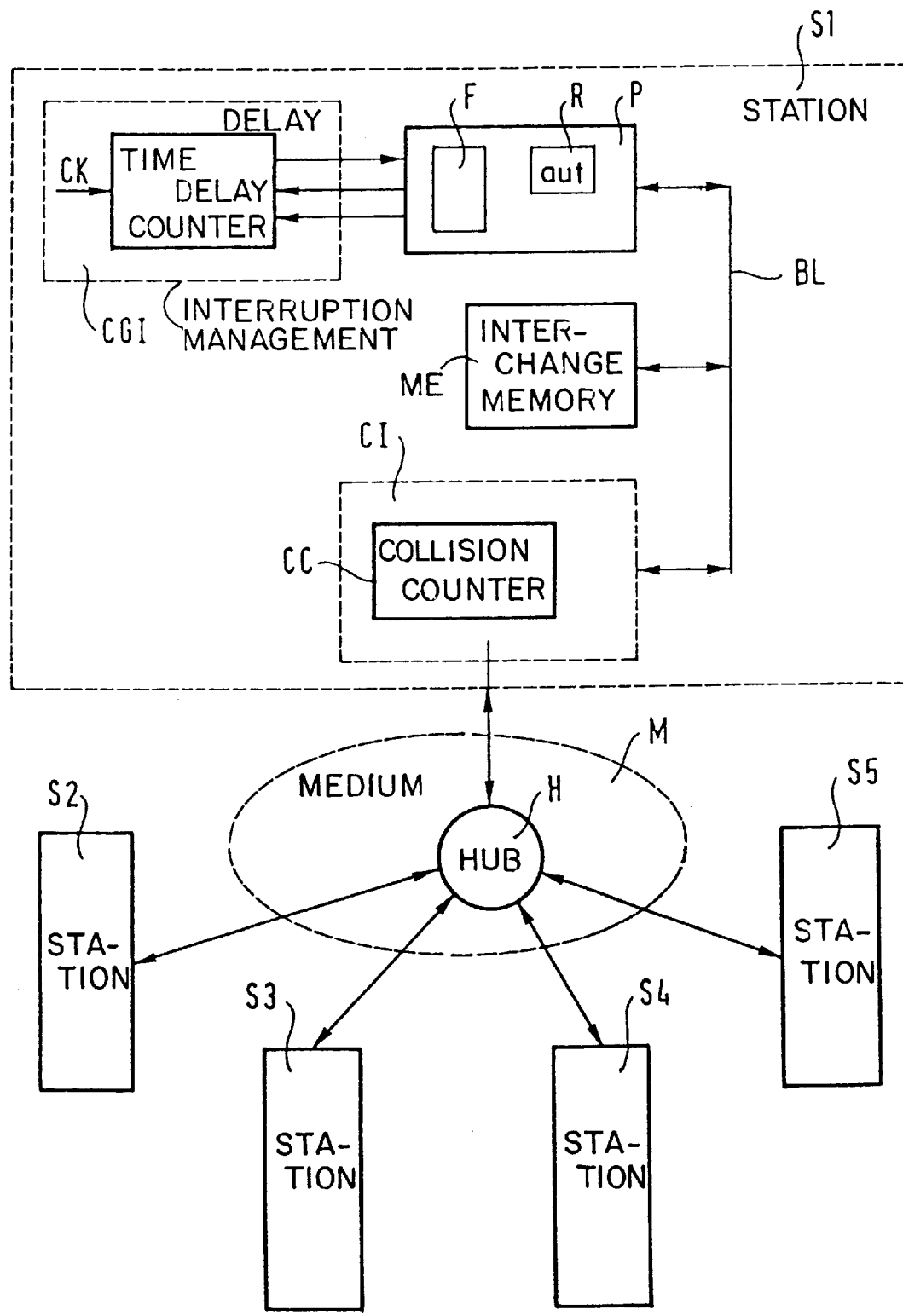
FIG. 2 is a block diagram summarizing this embodiment.

FIG. 2 is a block diagram summarizing an embodiment of the network of the invention. It includes five analogous stations S1, S2, S3, S4, and S5 connected to a common medium M constituted by individual links for respective ones of all of the stations, and by a "passive hub" H on which said links converge. This star structure is equivalent to a bus going from station to station. In particular, two frames collide if two stations try to transmit at the same time. Each station, e.g. station S1, comprises:

a local bus BL;

a processor P comprising an input/output connected to the local bus BL, a register R for storing the flag "aut", a queue F in which to put one or more frames that are ready to be transmitted but that cannot be transmitted immediately;

an "interchange" memory ME having an input/output connected to the local bus BL;

a conventional interruption management circuit comprising a time-delay counter DELAY having: a clock input for receiving a clock signal, and a decrementation control input and an initialization input connected respectively to two outputs of the processor P, and an output connected to an input of the processor P to supply it with an interruption signal causing it to decrement the value "delay" of the counter DELAY; and an interface circuit CI having an input/output connected to the local bus BL, and an input/output connected to the "hub" H, and including a collision counter CC.

Figure 3:
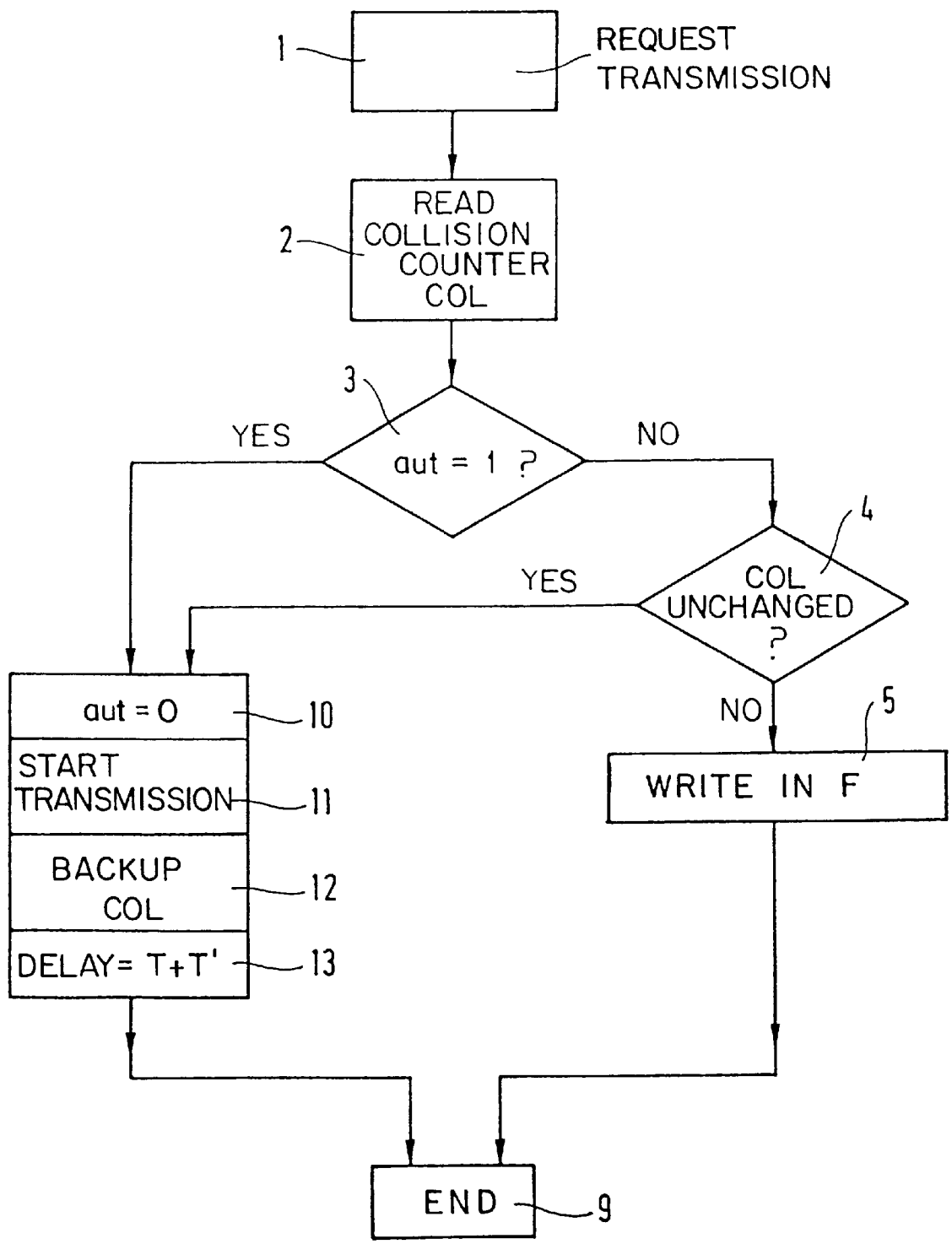
FIG. 3 is a flow chart of the operations performed in this embodiment.

FIG. 3 is a flow chart showing the operations performed in this embodiment. An application makes a transmission request 1. The processor P reads 2 the value "col" of the collision counter CC. Then it tests 3 the value of the flag "aut".

If the flag is equal to 1, the processor P successively performs the following operations:

resetting 10 the flag "aut" to 0;

starting transmission 11 of the frame to be transmitted, via the interchange memory ME, and the interface circuit CI;

backing up 12 the value "col" of the collision counter CC;

re-initializing 13 the time-delay counter DELAY to the value T+T', where T is the time calculated for transmitting the frame which is to be transmitted, and where T'=T in this example; and ending 9 the sequence.

If the flag is equal to 0, the processor P compares 4 the "col" value that it has just read with the preceding "col" value that it has backed up; and if the two values are identical, the processor P performs the above-mentioned operations 10, . . . 13, and 9;

otherwise, it performs an operation 5 consisting in writing the frame to be transmitted in the queue F, and goes to the end 9 of the sequence.

Furthermore, the interruption management circuit CGI periodically supplies the processor P with an interrupt signal causing it to decrement the value "delay" of the time-delay counter DELAY until said value reaches 0. When said value reaches 0, the processor p sets the flag "aut" to 1 again, and it transmits the first of the frames that are waiting in the queue f over the medium m.

What is claimed is:

1. A data-processing network having non-deterministic access but having a deterministic access time, the network including a plurality of stations communicating with one another by accessing a common medium using a non-deterministic protocol, wherein each respective one of said plurality of stations includes:

means for detecting whether there is a risk of collision between two or more of the plurality of stations trying to access the common medium; and a means for limiting a mean bit rate of the station over the common medium to a predetermined maximum value at least during periods in which there is a risk of collision between a plurality of stations trying to access the common medium, said maximum value being chosen such that a sum of the maximum values chosen for all of the stations is less than a mean bit rate that can be accommodated by the common medium.

2. A network according to claim 1, wherein the means for limiting the mean bit rate of the respective station comprise time-delay means authorizing a station to access the common medium after expiration of a delay, said delay starting at an end of a most recent access by the station, and said delay having a duration which is proportional to a duration of said most recent access.

3. A network according to claim 1, wherein the means for detecting whether there is a risk of collision between the plurality of stations comprises, means for determining whether at least one collision has taken place since a beginning of the most recent transmission performed by the station over the common medium, and for concluding that there is a risk of collision if at least one collision has occurred since the end of the most recent transmission performed by said station.

4. A data processing network including a plurality of stations communicating with each other by accessing a common medium using a non-deterministic protocol, each one of said plurality of stations including:

a collision counter to detect a number of collisions on the common medium;

a time delay counter receiving a clock signal, said time delay counter including a decrementing circuit;

a register storing an authorization flag; and a processor interconnecting the time delay counter, register, and collision counter, the processor receiving an output of the time delay counter and a count value of the collision counter to set a state of the authorization flag in the register, wherein said processor determines authorization access of the station to the common medium based on the state of the authorization flag.

5. The data processing network according to claim 4, wherein said authorization flag is set to an allow access state for the station when the decrementing circuit of the time delay counter counts down to zero from a predetermined value, wherein the predetermined value corresponds to a delay time for transmission of data from the station and an additional.

6. The data processing network according to claim 4, wherein said authorization flag is set to an allow access state for the station when the decrementing circuit of the time delay counter counts down to zero from a predetermined value, wherein the predetermined value corresponds to a delay time for transmission of data from the station and an additional interval, wherein the additional interval is proportional to a duration of a most recent access time of the station to the common medium.

7. The data processing network according to claim 5, wherein the additional interval is proportional to a duration of a most recent access time of the station to the common medium.

8. The data processing network according to claim 7, wherein said processor further stores a previous count value of the collision counter and when the authorization flag is set to a no access state, said processor compares the previous count value with the number of collisions presently detected by the collision counter and if the previous count value is equal to the presently detected number of collisions, the station is allowed access to the common medium.

\* \* \* \* \*